(12) United States Patent
Lim et al.

(10) Patent No.: US 11,858,364 B2
(45) Date of Patent: Jan. 2, 2024

(54) BATTERY CASE MOUNTING STRUCTURE FOR ELECTRIC VEHICLE

(71) Applicants: HYUNDAI MOTOR COMPANY, Seoul (KR); KIA CORPORATION, Seoul (KR)

(72) Inventors: Jun Young Lim, Incheon (KR); Jin Won Kim, Pyeongtaek-si (KR); Sung Bae Bang, Suwon-si (KR); Jong Seop Song, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 355 days.

(21) Appl. No.: 17/306,434

(22) Filed: May 3, 2021

(65) Prior Publication Data

US 2022/0089040 A1    Mar. 24, 2022

(30) Foreign Application Priority Data

Sep. 23, 2020   (KR) .......................... 10-2020-0123074

(51) Int. Cl.
*B60L 50/60* (2019.01)
*B60K 1/04* (2019.01)
*B60L 58/26* (2019.01)
*B60K 11/08* (2006.01)

(52) U.S. Cl.
CPC ................ *B60L 50/66* (2019.02); *B60K 1/04* (2013.01); *B60K 11/08* (2013.01); *B60L 58/26* (2019.02); *B60K 2001/0438* (2013.01)

(58) Field of Classification Search
CPC .... B60K 2001/0438; B60K 2001/0422; B60K 2001/005; B60K 11/08
See application file for complete search history.

(56) References Cited

U.S. PATENT DOCUMENTS

| | | | |
|---|---|---|---|
| 9,302,573 B2* | 4/2016 | Janarthanam | ........... B60L 58/26 |
| 9,914,346 B1* | 3/2018 | Fujiwara | .................. B60K 1/04 |
| 2012/0043147 A1* | 2/2012 | Milner | ................... B60L 50/64 |
| | | | 180/68.5 |
| 2012/0138260 A1* | 6/2012 | Lee | ..................... H01M 10/625 |
| | | | 165/41 |

(Continued)

FOREIGN PATENT DOCUMENTS

KR    10-2012-0094697    8/2012

*Primary Examiner* — Katy M Ebner
(74) *Attorney, Agent, or Firm* — Lempia Summerfield Katz LLC

(57) ABSTRACT

A battery case mounting structure for an electric vehicle includes: a vehicle body floor in which a plurality of seats are installed; a battery case provided below the vehicle body floor, having a battery module therein, and including an air inlet, through which air is suctioned, disposed on a rear side of the battery case, and an air outlet, through which air is discharged, disposed on a front side of the battery case; an intake duct configured to communicate with the air inlet at an upper portion of the vehicle body floor and guide interior air to an interior of the battery case; and a discharge duct configured to communicate with the air outlet at the upper portion of the vehicle body floor, extending from the upper portion of the vehicle floor to a rear side of the vehicle body floor, and configured to discharge air to outside.

10 Claims, 8 Drawing Sheets

(56) References Cited

U.S. PATENT DOCUMENTS

| | | | | |
|---|---|---|---|---|
| 2014/0262573 | A1* | 9/2014 | Ito | B60K 1/04 |
| | | | | 180/68.5 |
| 2016/0301120 | A1* | 10/2016 | Katsuno | H01M 10/625 |
| 2017/0267057 | A1* | 9/2017 | Koyama | B60H 1/246 |
| 2017/0267058 | A1* | 9/2017 | Koyama | B60N 2/015 |
| 2017/0267059 | A1* | 9/2017 | Koyama | B62D 25/20 |
| 2018/0015806 | A1* | 1/2018 | Yasuda | B60L 58/26 |
| 2018/0050606 | A1* | 2/2018 | Sugitate | B60K 11/06 |
| 2018/0257482 | A1* | 9/2018 | Kondo | B60K 11/08 |
| 2020/0063639 | A1* | 2/2020 | Nakamura | F01P 11/10 |
| 2021/0178882 | A1* | 6/2021 | Kim | B60K 1/04 |
| 2021/0257694 | A1* | 8/2021 | Kim | B60L 50/64 |

\* cited by examiner

BATTERY CASE MOUNTING STRUCTURE FOR ELECTRIC VEHICLE

CROSS REFERENCE TO RELATED APPLICATION

This application claims priority to and the benefit of Korean Patent Application No. 10-2020-0123074, filed on Sep. 23, 2020, the entire contents of which are incorporated herein by reference.

FIELD

The present disclosure relates to a battery case mounting structure for an electric vehicle.

BACKGROUND

The statements in this section merely provide background information related to the present disclosure and may not constitute prior art.

Eco-friendly vehicles have recently been drawing attention in line with environmental issues, high gasoline prices, and the like, and various electric cars configured to be driven by using electric energy have been developed.

Such electric cars that are being developed include pure electric cars (battery-powered EVs), fuel-cell EVs that use fuel cells as motors, and hybrid EVs that use both motors and engines.

Particularly, electric cars have battery modules for storing electric energy, and each battery module has multiple battery cell units contained in a battery case. Such a battery case has a large volume and a large weight, and it is thus crucial to provide a mounting space in the vehicle body such that the battery case can be mounted on the vehicle body. Moreover, battery modules generate a large amount of heat during driving.

The above descriptions regarding background arts are only for helping understanding of the background of the present disclosure, and are not to be considered by a person skilled in the art as corresponding to already-known prior arts.

SUMMARY

The present disclosure provides a battery case mounting structure for an electric vehicle, wherein a battery case is provided below a vehicle body floor, thereby providing an interior space, and interior air is used to cool battery modules, thereby simplifying the cooling structure.

A battery case mounting structure for an electric vehicle according to the present disclosure may include: a vehicle body floor, in which a plurality of seats are installed in a forward/rearward direction; a battery case provided below the vehicle body floor, having a battery module therein, and including an air inlet, through which air is suctioned, disposed on a rear side of the battery case and an air outlet, through which air is discharged, disposed on the front side thereof; an intake duct configured to communicate with the air inlet at an upper portion of the vehicle body floor and guide interior air to an interior of the battery case; and a discharge duct configured to communicate with the air outlet at an upper portion of the vehicle body floor, extending to the rear side of the vehicle body floor, and configured to discharge air, which cooled the battery module, to an outside.

The air inlet and the air outlet may be disposed to be inclined in an outward direction of the vehicle body floor in the battery case.

The battery case may be provided below a front seat on the vehicle body floor, and the intake duct may be provided below the front seat, and the discharge duct may be provided on the front side of the intake duct on the lower side of the front seat and may extend from the front seat toward the rear seat.

The intake duct may be formed to extend upwards, and a suction hole, through which interior air is suctioned, may be formed at an end of the extension of the intake duct.

The vehicle body floor may be provided with a plurality of cross members, in which a front seat is installed. The intake duct may be provided below the front seat between the cross members, in which the front seat is installed. The discharge duct may be provided on the front side of a front cross member, among the cross members, in which the front seat is installed, and may extend rearwards past a rear cross member.

The discharge duct may include vertical steps, extend rearwards, pass through the plurality of cross members, and may be divided into upper extensions passing through the cross members and lower extensions extending along the vehicle body floor.

A battery case mounting structure may further include moisture outlets, through which moisture is discharged to the outside, formed in some sections of the lower extensions of the discharge duct.

The moisture outlets may be formed in the lower extensions at the lowest locations of the steps.

The discharge duct may be provided with a grill part installed in the discharge hole and including a plurality of holes formed by a plurality of ribs crossing the discharge hole upwards and downwards.

A plurality of connection members including the plurality of cross members may be provided in the vehicle body floor, and a space having no connection member and provided with the battery case may be formed at a portion at which the battery case is mounted.

A battery case mounting structure for an electric vehicle, configured as described above, is advantageous in that a battery case is provided below a vehicle body floor, thereby providing an interior space, and interior air is used to cool battery modules, thereby simplifying the cooling structure.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 5:
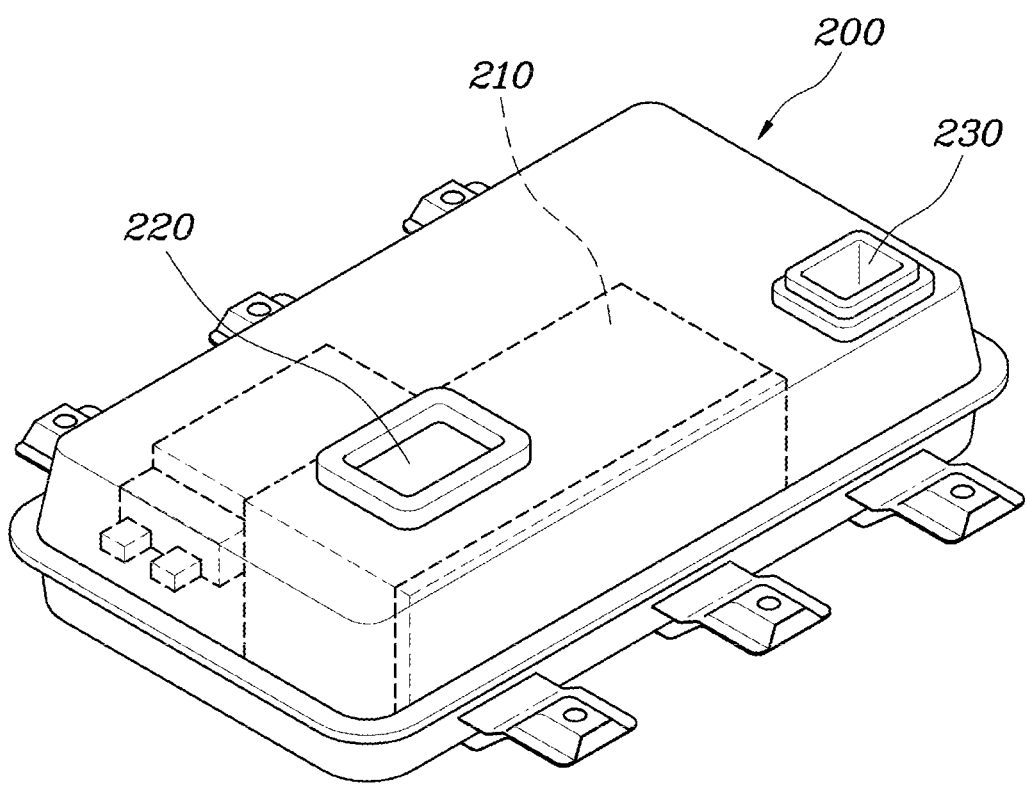
Figure 6:
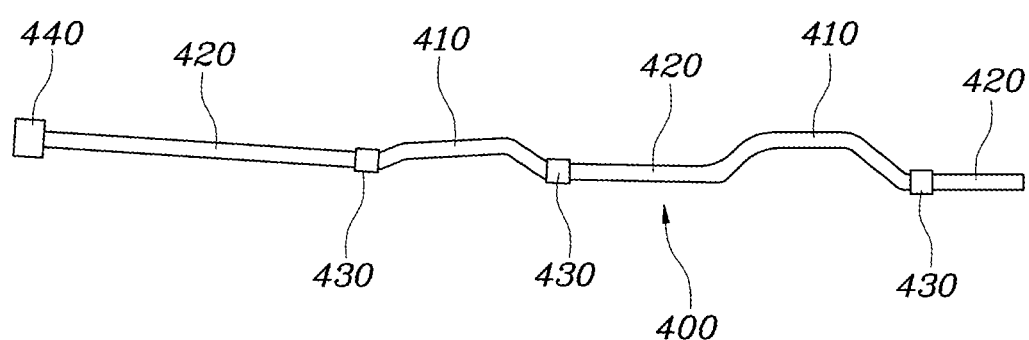
Figure 7:
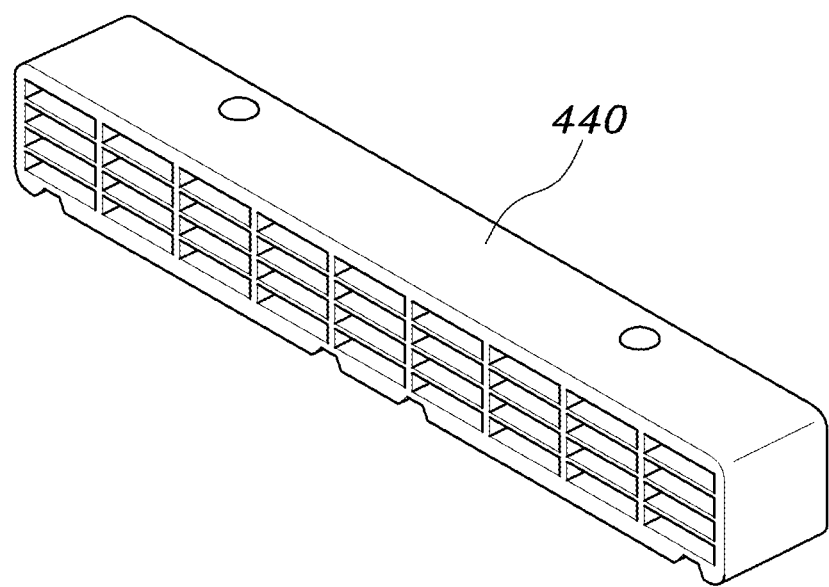
Figure 8:
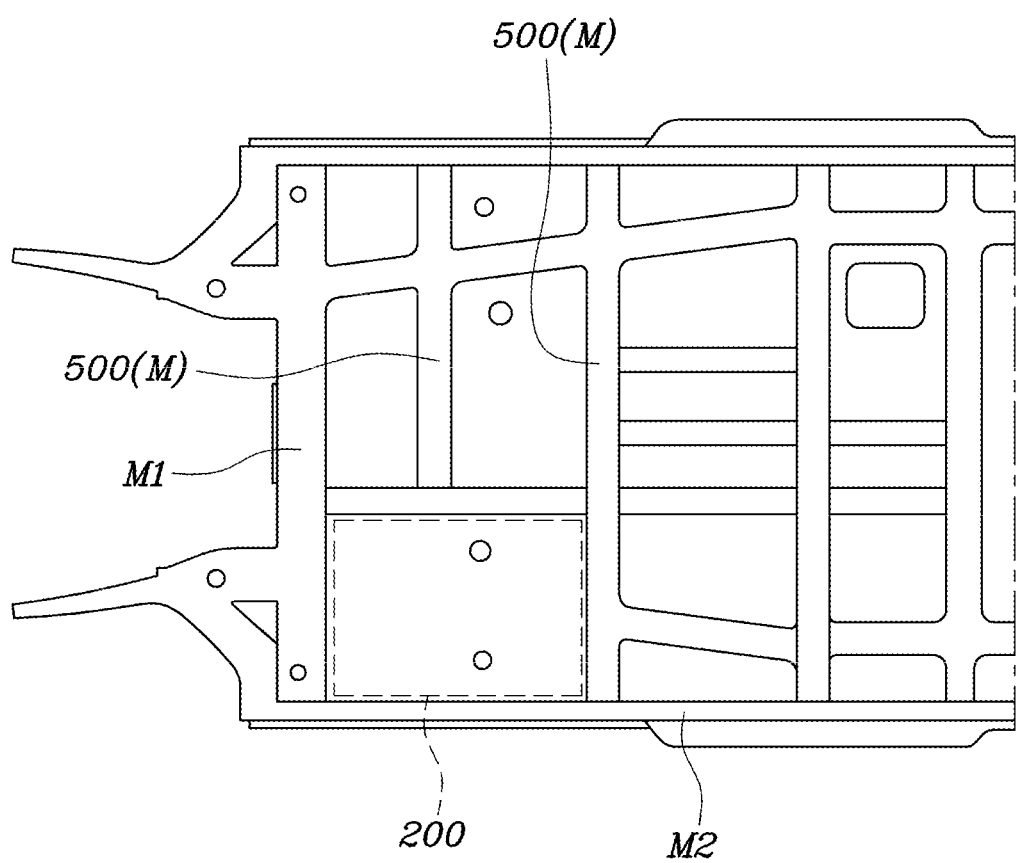

FIG. 5 is a view illustrating the battery case;
FIG. 6 is a view illustrating a discharge duct;
FIG. 7 is a view illustrating a grill part; and
FIG. 8 is a view illustrating a connection member.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, a battery case mounting structure for an electric vehicle according to one form of the present disclosure will be described with reference to the accompanying drawings.

Figure 1:
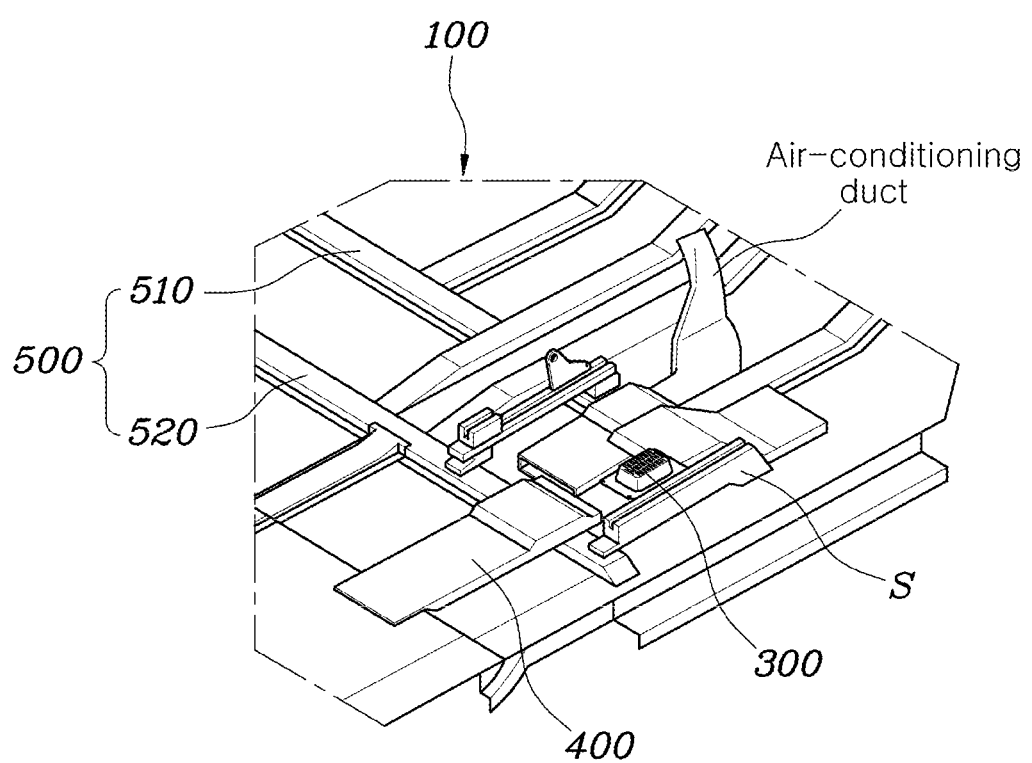
FIG. 1 is a view illustrating a battery case mounting structure for an electric vehicle according to one form the present disclosure.
Figure 2:
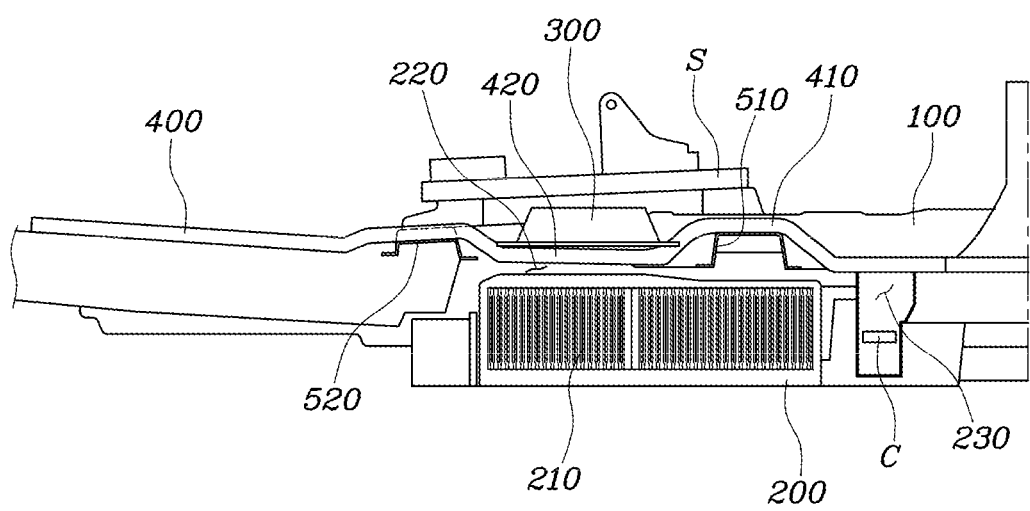
FIG. 2 is a cross-sectional view of the battery case mounting structure for an electric vehicle illustrated in FIG. 1.

FIG. 1 is a view illustrating a battery case mounting structure for an electric vehicle according to one form the present disclosure. FIG. 2 is a cross-sectional view of the battery case mounting structure for an electric vehicle illustrated in FIG. 1. FIGS. 3 to 8 are views for explaining the battery case mounting structure for an electric vehicle illustrated in FIG. 1.

The battery case mounting structure for an electric vehicle according to the present disclosure, as illustrated in FIGS. 1 and 2, includes a vehicle body floor 100, in which a plurality of seats are installed, a battery case 200 provided on the lower side of the seats below the vehicle body floor 100, having a battery module 210 therein, and having an air inlet 220, through which air is suctioned, and an air outlet 230, through which air is discharged, wherein the air inlet 220 is disposed on the rear side thereof and the air outlet 230 is disposed on the front side thereof, an intake duct 300 connected to communicate with the air inlet 220 at an upper portion of the vehicle body floor 100 and configured to guide interior air to the interior of the battery case 200, and a discharge duct 400 connected to communicate with the air outlet 230 at an upper portion of the vehicle body floor 100, extending to the rear side of the vehicle body floor 100, and configured to discharge air, which cooled the battery module 210, to the outside.

The battery case 200 may have the battery module 210 for supplying electric power therein, and may be mounted on a lower portion of the vehicle body floor 100. A blowing device C for cooling various electric components and circulating air, in addition to the battery module 210, is provided in the interior of the battery case 200. Further, the air inlet 220, through which the air for cooling the battery module 210 is introduced, and the air outlet 230, through which the air that cooled the battery module 210 is discharged, are formed in the battery case 200. Accordingly, when the blowing device C is driven, the air introduced through the air inlet 220 is discharged through the air outlet 230 after cooling the battery module 210.

Figure 3:
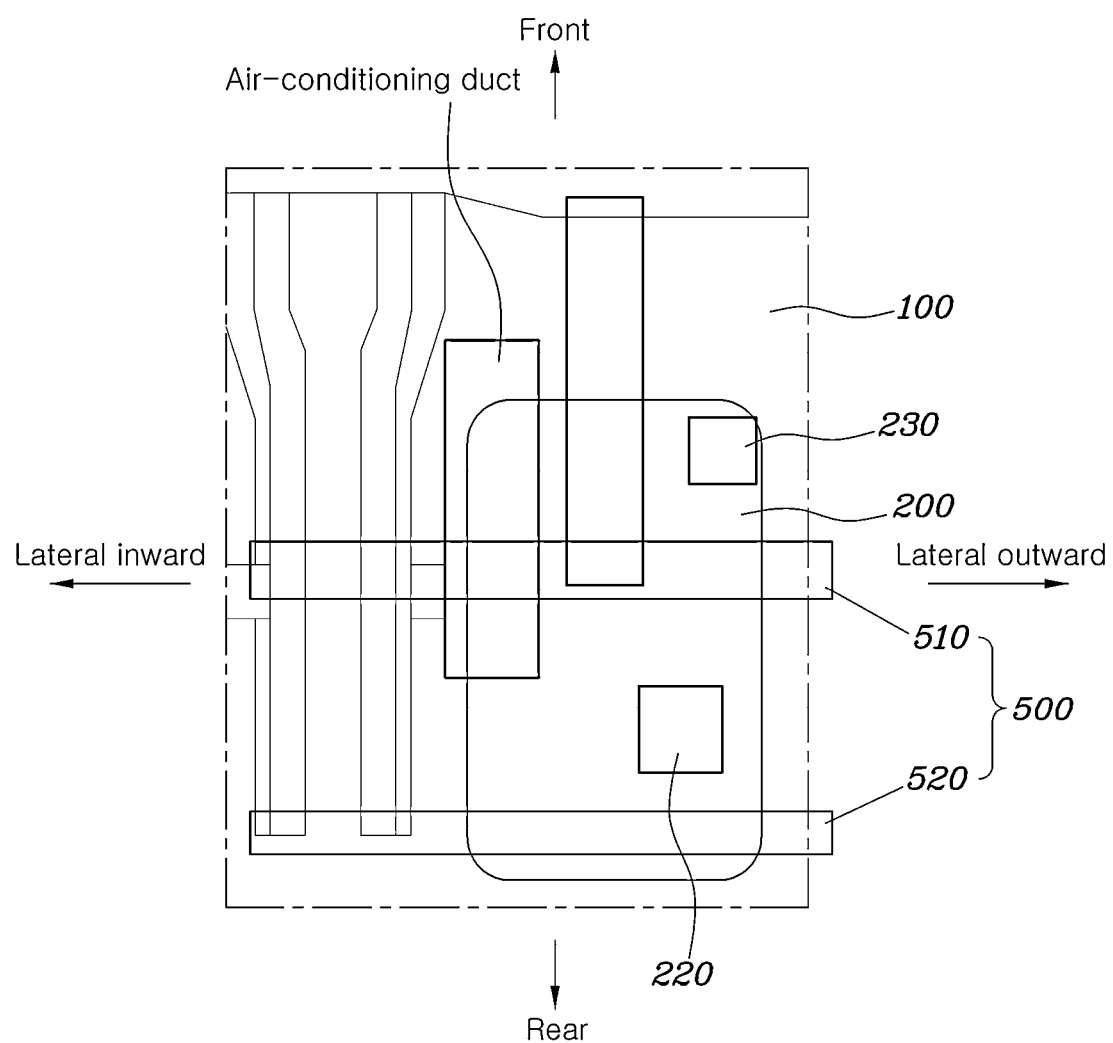
FIG. 3 is a view of a vehicle body floor and the battery case for explaining the battery case mounting structure for an electric vehicle illustrated in FIG. 1.
Figure 4:
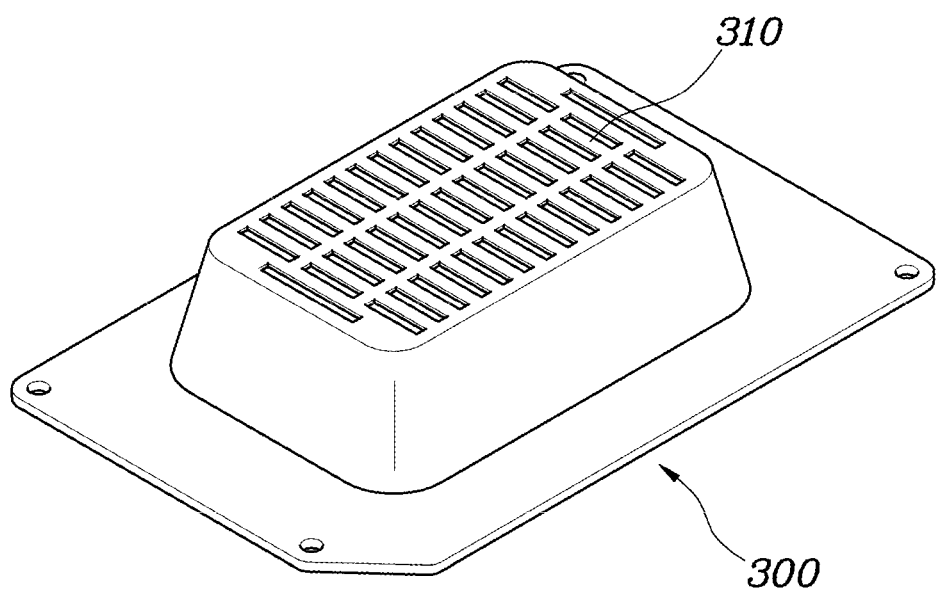
FIG. 4 is a view illustrating an intake duct.

In particular, in the present disclosure, the air inlet 220 may be disposed on the rear side of the battery case 200, the air outlet 230 may be disposed on the front side of the battery case 200, and the blowing device C may be installed on a side of the interior of the battery case 200, which is close to the air outlet 230. Accordingly, the air flowing into the interior of the battery case 200 may be introduced through the air inlet 220, may flow from the rear side to the front side of the battery case 200, and may be discharged through the air outlet 230. In addition, as can be seen in FIGS. 3 and 4, the air inlet 220 and the air outlet 230 are disposed to be inclined in an outward direction of the vehicle body floor 100 in the battery case 200, whereby an interference with an air-conditioning duct or a connection member can be avoided.

Meanwhile, the intake duct 300 is connected to the air inlet 220 of the battery case 200 to communicate with the air inlet 220 such that the interior air flows into the interior of the battery case 200. Of course, the intake duct 300 may flow into the exterior air into the battery case 200, but the degree of contamination of the exterior air is high and the exterior temperature changes variously, and the intake duct 300 causes the interior air, of which the degree of contamination is low and which is maintained at a proper temperature, to flow into the battery case 200.

The discharge duct 400 is connected to the air outlet 230 of the battery case 200 to communicate with the air outlet 230, and extends to the rear side of the vehicle body floor 100 to discharge the air that cooled the battery module 210 to the outside. That is, the discharge duct 400 extends along the bottom surface above the vehicle body floor 100, and an installation space for the discharge duct 400 is reduced as a discharge path extending from the front side to the rear side is formed. The discharge duct 400 may be buried under the bottom surface of the interior.

In this way, in the present disclosure, as the interior air flows in the interior of the battery case 200 through the intake duct 300 and the discharge duct 400 mounted on the battery case 200, the battery module 210 is cooled in an air cooling manner. Furthermore, even when the battery case 200 is provided below the seat, the intake duct 300 does not interfere with the feet of a passenger because it is disposed on the rear side of the battery case 200, and the discharge duct 400 does not interfere the feet of the passenger seated on the seat because it extends from the front side to the rear side of the battery case 200 but extends along the bottom surface above the vehicle body floor 100.

In a detailed description of the above-described contents of the present disclosure, the battery case 200 may be provided below a front seat on the vehicle body floor 100 such that the intake duct 300 is provided below the front seat and the discharge duct 400 is provided on the front side of the intake duct 300 on the lower side of the front seat and extends from the front seat toward the rear seat. In the drawings, it is illustrated as rails S of the seat.

The seats installed on the vehicle body floor 100 may be divided into a front seat and a rear seat, and the front seat may correspond to a first row seat and the rear seat may corresponds to a second row seat. Here, the battery case 200 may be provided below the front seat in the vehicle body floor 100, and the front seat may be a passenger seat.

In this way, as the battery case 200 is mounted on the lower side of the passenger seat on the front side, a trunk space, a spare tire space, and the like may be secured as marginal spaces, and an influence on installation of other components is reduced. Further, the intake duct 300 connected to the battery case 200 is provided below the front seat, the discharge duct 400 is provided on the front side of the intake duct 300 below the front seat, and the discharge duct 400 is formed to extend to the rear side of the front seat. Accordingly, the intake duct 300 does not interfere with the feet of the passenger even though it is provided below the front seat, and the discharge duct 400 extends rearwards along the bottom surface even though it is located on the front side of the intake duct 300 below the front seat, whereby an interference with the feet of the passenger is avoided.

Meanwhile, as illustrated in FIG. 5, the intake duct 300 may be formed to extend upwards and a suction hole 310, through which interior air is suctioned, may be formed at an end of the extension of the intake duct 300.

That is, as the battery case 200 is located below the vehicle body floor 100, moisture may be introduced through the air inlet 220. Accordingly, because the intake duct 300 connected to an upper portion of the vehicle body floor 100 to communicate with the air inlet 220 is formed to extend upwards and the suction hole 310, through which interior air is suctioned, is formed at an end of the extension of the intake duct 300, moisture is inhibited from being introduced into the battery module 210 through the air inlet 220 even though moisture is generated on the bottom of the interior.

In addition, even though the intake duct 300 is formed to extend upwards, it does not interfere with the feet of the passenger because it is provided below the seat.

Meanwhile, as illustrated in FIG. 4, a plurality of cross members 500, in which a front seat is installed, may be provided in the vehicle body floor 100, the intake duct 300 may be provided below the front seat between the cross members 500, in which the front seat is installed, and the discharge duct 400 is provided on the front side of a front cross member 510, among the cross members 500, in which the front seat is installed, extends rearwards, and extends rearwards past a rear cross member 520.

The vehicle body floor 100 is provided with cross members 500 for providing rigidity and installing the seats. The front seat is installed through the cross-members and the intake duct 300 is provided between the cross members 500 below the front seat, whereby the feet of the passenger seated on the front seat are not interfered with by the intake duct 300. The discharge duct 400 is provided on the front side of the front cross member, among the cross members 500 in which the front seat is installed, but is buried under the bottom surface of the interior above the vehicle body floor 100, whereby it does not interfere with the feet of the passenger.

Through this, an installation space is reduced due to the battery case 200 provided below the front seat on the lower side of the vehicle body floor 100, and the intake duct 300 and the discharge duct 400 connected to the battery case 200 are not interfered with by the feet of the passenger seated on the seat.

Meanwhile, as illustrated in FIG. 6, the discharge duct 400 may have vertical steps as the discharge duct extends rearwards and passes through the plurality of cross members 500, and may be divided into upper extensions 410 passing through the cross members 500 and lower extensions 420 extending along the vehicle body floor 100.

As illustrated in FIGS. 2 to 6, the discharge duct 400 is formed to pass through the plurality of cross members 500 as it extends rearwards. Then, as the vertical steps are formed upwards and downward at portions, at which the cross members 500 are provided above the vehicle body floor 100, the discharge duct 400 is divided into upper extensions 410 passing through the cross members 500 and lower extensions 420 extending along the vehicle body floor 100. In this way, because the discharge duct 400 is formed to have the vertical steps with the upper extensions 410 and the lower extensions 420, it may extend rearwards past the cross members 500.

In particular, moisture outlets 430, through which moisture is discharged to the outside, may be formed in some sections of the lower extensions 420 of the discharge duct 400. In addition, the moisture outlets 430 may be formed the lower extensions 420 at the lowest locations of the steps.

In this way, because the moisture outlets 430 are formed in some sections of the lower extensions 420 of the discharge duct 400, moisture is inhibited from being introduced into the battery module 210 when the moisture is introduced into the discharge duct 400. In particular, because the moisture outlets 430 are formed at sites at which moisture gathers as the step is lowest in the lower extensions 420, moisture generated in the discharge duct 400 can be efficiently discharged.

The moisture outlets 430 may have holes passing through the lower extensions 420 inwards and outwards. In addition, sponge may be attached to the corresponding holes to maintain the sealed state of the duct and discharge moisture. As another form, the moisture outlets 430 may have one-way plugs to discharge the moisture generated in the discharge duct 400 to the outside and inhibit exterior moisture from being introduced into the discharge duct 400. The moisture outlets 420 may be applied in various other forms.

Accordingly, because the moisture introduced through the discharge duct 400 is inhibited from flowing toward the battery module 210, the battery module 210 can be inhibited from being damaged due to moisture.

Meanwhile, as illustrated in FIG. 7, a grill part 440 installed in the discharge hole and having a plurality of holes due to a plurality of ribs crossing the discharge hole upwards and downwards is provided in the discharge duct 400.

Because the grill part 440 has the plurality of holes due to the plurality of ribs, it has a mesh structure, whereby foreign substances introduced into the discharge hole can be blocked while the flow of the air discharged through the discharge hole is not interrupted. Accordingly, because the air flowing through the discharge duct 400 is smoothly discharged through the discharge hole, the cooling of the battery module 210 can be stably maintained.

Meanwhile, as illustrated in FIG. 8, a plurality of connection members M including the plurality of cross members 500 may be provided in the vehicle body floor 100, and a space having no connection member N and provided with the battery case 200 may be formed at a portion, at which the battery case 200 is mounted.

That is, a plurality of connection members M for providing rigidity and installing components are provided in the vehicle body floor 100, and the connection members M may be a front member M1, a side member M2, and the cross members 500. Here, as the battery case 200 is provided below the vehicle body floor 100, no connection member M is present at the corresponding portion and the battery case 200 is provided at the corresponding portion, whereby a space due to installation of the battery case 200 can be reduced. Here, the connection members M may be formed to surround the battery case 200 provided below the vehicle body floor 100.

The battery case (200) mounting structure for an electric vehicle having the above-described structure is provided with the battery case 200 below the vehicle body floor to provide an interior space, and the cooling structure is simplified as the battery module 210 is cooled by using interior air.

Therefore, the disclosed forms of the present disclosure do not limit the technical spirit of the present disclosure but are illustrative, and the scope of the technical spirit of the present disclosure is not limited by the forms of the present disclosure.

What is claimed is:

1. A battery case mounting structure for an electric vehicle, the battery case mounting structure comprising:

a vehicle body floor on which a plurality of seats are installed;

a battery case provided below the vehicle body floor, having a battery module therein, and including:
 an air inlet configured to introduce air and disposed on a rear side of the battery case, and
 an air outlet configured to discharge the air and disposed on a front side of the battery case;

an intake duct configured to communicate with the air inlet at an upper portion of the vehicle body floor and guide interior air of a vehicle cabin to an interior of the battery case; and a discharge duct configured to:
 communicate with the air outlet at the upper portion of the vehicle body floor,
 extend along the upper portion of the vehicle body floor to the rear side of the battery case, and
 discharge air to outside of the electric vehicle.

2. The battery case mounting structure of claim 1, wherein the air inlet and the air outlet are positioned to be offset in a lateral outward direction of the vehicle body floor.

3. The battery case mounting structure of claim 1, wherein:
 the battery case is provided below a front seat on the vehicle body floor,
 the intake duct is provided below the front seat
 the discharge duct is extended from the front seat toward a rear seat, and
 a portion of the discharge duct, which is located under the front seat, is provided on a front side of the intake duct.

4. The battery case mounting structure of claim 1, wherein the intake duct is configured to extend upwards and includes a suction hole through which the interior air is suctioned,
 wherein the suction hole is formed at an end of an extension of the intake duct.

5. The battery case mounting structure of claim 1, wherein:
 the vehicle body floor is provided with a plurality of cross members on which a front seat is installed;
 the intake duct is provided below the front seat between the plurality of cross members; and
 the discharge duct is provided on a front side of a front cross member of the plurality of cross members and extends rearwards past a rear cross member of the plurality of cross members.

6. The battery case mounting structure of claim 5, wherein the discharge duct includes vertical steps, extends rearwards, passes over through the plurality of cross members, and is divided into upper extensions passing through the plurality of cross members and lower extensions extending along the vehicle body floor.

7. The battery case mounting structure of claim 6, further comprising moisture outlets configured to discharge moisture to an outside and formed in some sections of the lower extensions of the discharge duct.

8. The battery case mounting structure of claim 7, wherein the moisture outlets are formed in the lower extensions at lowest locations of the steps.

9. The battery case mounting structure of claim 1, wherein the discharge duct is provided with a grill part installed in a discharge hole and including a plurality of holes formed by a plurality of ribs crossing the discharge hole upwards and downwards.

10. The battery case mounting structure of claim 1, further comprising:
 a plurality of connection members provided in the vehicle body floor and comprising a plurality of cross members,
 wherein no connection members are provided in a space formed at a portion at which the battery case is mounted.

* * * * *